US009106161B2

(12) United States Patent
Feuerstack et al.

(10) Patent No.: US 9,106,161 B2
(45) Date of Patent: Aug. 11, 2015

(54) METHOD FOR SETTING A DESIRED OUTPUT VOLTAGE OF A POWER SUPPLY BRANCH OF A CONTROLLABLE ENERGY STORE

(75) Inventors: Peter Feuerstack, Ludwigsburg (DE); Erik Weissenborn, Stuttgart (DE)

(73) Assignee: ROBERT BOSCH GMBH, Stuttgart (DE)

( * ) Notice: Subject to any disclaimer, the term of this patent is extended or adjusted under 35 U.S.C. 154(b) by 321 days.

(21) Appl. No.: 13/825,267

(22) PCT Filed: Aug. 24, 2011

(86) PCT No.: PCT/EP2011/064552

§ 371 (c)(1), (2), (4) Date: May 16, 2013

(87) PCT Pub. No.: WO2012/038174

PCT Pub. Date: Mar. 29, 2012

(65) Prior Publication Data

US 2013/0221878 A1 Aug. 29, 2013

(30) Foreign Application Priority Data

Sep. 20, 2010 (DE) ........................ 10 2010 041 059

(51) Int. Cl.
*H02P 27/02* (2006.01)
*H02P 4/00* (2006.01)
(Continued)

(52) U.S. Cl.
CPC ............... *H02P 4/00* (2013.01); *B60L 11/1853* (2013.01); *B60L 11/1864* (2013.01);
(Continued)

(58) Field of Classification Search
CPC ................................ H02P 27/00; H02P 27/02
USPC .............. 318/105–113, 139, 400.3, 812, 442, 318/459, 500, 504
See application file for complete search history.

(56) References Cited

U.S. PATENT DOCUMENTS

| | | | |
|---|---|---|---|
| 3,100,851 A | 8/1963 | Ross et al. | |
| 3,100,857 A | 8/1963 | Rice et al. | |
| 4,238,820 A * | 12/1980 | Naaijer | 363/43 |
| 4,680,690 A | 7/1987 | Dickerson | |
| 6,392,311 B2 * | 5/2002 | Inaba et al. | 290/38 R |

(Continued)

FOREIGN PATENT DOCUMENTS

| | | |
|---|---|---|
| CN | 1526193 | 9/2004 |
| DE | 101 03 031 | 7/2002 |

(Continued)

OTHER PUBLICATIONS

International Search Report, PCT International Application No. PCT/EP2011/064552, dated Jul. 17, 2012.

*Primary Examiner* — Bentsu Ro
(74) *Attorney, Agent, or Firm* — Kenyon & Kenyon LLP

(57) ABSTRACT

A method for setting a desired output voltage of a power supply branch of a controllable energy store, for controlling and supplying electrical energy to an n-phase electric motor, where n≥1. The controllable energy store has n parallel power supply branches, which each have at least two serially connected energy storage modules including at least one electrical energy storage cell having an assigned, controllable coupling unit; are connected to a reference bus on one side; and are connected to phases, respectively, of the electric motor on the other side. At least one coupling unit is controlled by pulses so that the arithmetic mean of the output voltage of a power supply branch corresponds to the desired output voltage. The energy storage cells respectively assigned to the coupling unit are switched into the respective power supply branch for a pulse duration, and are bypassed during a pause time.

2 Claims, 2 Drawing Sheets

(51) Int. Cl.

| | |
|---|---|
| ***H02J 7/00*** | (2006.01) |
| ***H02M 7/501*** | (2007.01) |
| ***B60L 11/18*** | (2006.01) |
| *H02M 7/483* | (2007.01) |

(52) U.S. Cl.

CPC ............ *H02J 7/0024* (2013.01); *H02J 7/0065* (2013.01); *H02M 7/501* (2013.01); *H02J 7/0063* (2013.01); *H02J 2007/0067* (2013.01); *H02M 7/483* (2013.01); *H02M 2007/4835* (2013.01); *Y02T 10/7005* (2013.01); *Y02T 10/7061* (2013.01)

(56) References Cited

U.S. PATENT DOCUMENTS

| | | | | |
|---|---|---|---|---|
| 6,430,692 | B1 * | 8/2002 | Kimble et al. | 713/300 |
| 2007/0034246 | A1 | 2/2007 | Nakata | |
| 2012/0256568 | A1 * | 10/2012 | Lee | 318/139 |

FOREIGN PATENT DOCUMENTS

| | | |
|---|---|---|
| DE | 10 2010 027 857 | 10/2011 |
| DE | 10 2010 027 861 | 10/2011 |
| WO | WO 2011 128 136 | 10/2011 |

* cited by examiner

METHOD FOR SETTING A DESIRED OUTPUT VOLTAGE OF A POWER SUPPLY BRANCH OF A CONTROLLABLE ENERGY STORE

FIELD

The present invention relates to a method for setting a desired output voltage of a power supply branch of a controllable energy store.

BACKGROUND INFORMATION

It is becoming apparent that both in stationary applications, such as wind turbines, and in vehicles, such as hybrid or electric vehicles, electronic systems, which combine new energy storage technologies with electrical drive engineering, will be used more and more in the future. In conventional applications, an electric motor, which is configured, e.g., as a polyphase machine, is controlled by a frequency converter in the form of an inverter. A so-called constant-voltage d.c. link, via which an energy store, generally, a battery, is connected to the d.c. side of the inverter, is characteristic of such systems. In order to be able to satisfy the given power and energy requirements for a specific application, several battery cells are connected in series. Since the current provided by such an energy store must flow through all of the battery cells, and a battery cell can only carry a limited current, battery cells are often additionally connected in parallel in order to increase the maximum current.

In addition to a high overall voltage, the series connection of several battery cells has the problem that the entire energy store fails when a single battery cell fails, since then, battery current may no longer flow. Such a failure of the energy store may lead to a failure of the overall system. In the case of a vehicle, a failure of the drive battery may cause the vehicle to "die." In other applications, such as the adjustment of the rotor blades of wind turbines, this may even bring about unsafe situations in the event of unfavorable conditions, such as high winds. Therefore, a high degree of reliability of the energy store should always be strived for, "reliability" referring to the ability of a system to operate faultlessly for a predefined period of time.

German Patent Application Nos. DE 10 2010 027857 and DE 10 2010 027861 describe batteries having several battery module lines, which are directly connectible to an electric motor. In this context, the battery module lines have several battery modules connected in series, each battery module having at least one battery cell and an assigned, controllable coupling unit, which allows it, as a function of control signals, to disconnect the specific battery module line or to bypass the at least one respectively assigned battery cell or to switch the at least one respectively assigned battery cell into the respective battery module line. By suitably controlling the coupling units, e.g., with the aid of pulse width modulation, suitable phase signals may be provided for controlling the electric motor, which means that a separate pulse-controlled inverter may be omitted. Consequently, the pulse-controlled inverter necessary for controlling the electric motor is, as it were, integrated into the battery. For the purpose of the present application, these two German applications are incorporated into the present application by reference in their entirety.

SUMMARY

The present invention provides a method for setting a desired output voltage of a power supply branch of a controllable energy store, which is used for controlling and supplying electrical energy to an n-phase electric motor, where n≥1. In this context, the controllable energy store has n parallel power supply branches, which each have at least two serially connected energy storage modules that each include at least one electrical energy storage cell having an assigned, controllable coupling unit. The power supply branches are connectible, on one side, to a reference potential referred to below as a reference bus, and on the other side, to one phase of the electric motor, each. As a function of control signals, the coupling units either bypass the respectively assigned energy storage cells or they switch the respectively assigned energy storage cells into the respective power supply branch. At least one coupling unit is controlled by pulses in such a manner, that the arithmetic mean of the output voltage of a power supply branch corresponds to the desired output voltage; the energy storage cells respectively assigned to the at least one coupling unit being switched into the respective power supply branch for the duration of a pulse, and being bypassed during a pause time.

The overall output voltages of the power supply branches of an energy store controllable in such a manner are determined by the specific switching state of the controllable switch elements of the coupling units and may be adjusted in steps. In this context, the gradation is produced as a function of the voltage of the individual energy storage modules. If one starts out from a preferred specific embodiment of energy storage modules of the same kind, then a maximum possible, total output voltage is obtained from the voltage of an individual energy storage module times the number m of serially connected energy storage modules per power supply branch. If electric motors are driven by an energy store controllable in such a manner, then, in particular, in the case of low output voltages, torque fluctuations of the electric motor may result due to the stepped nature of the output voltage.

In accordance with example embodiments of the present invention, at least one coupling unit is controlled in a pulse-shaped manner, the energy storage cells respectively assigned to the at least one coupling unit being switched into the respective power supply branch for the duration of a pulse, and being bypassed during a pause time. In this way, by suitably selecting the duty factor, the arithmetic mean of the output voltage of a power supply branch may be adjusted in such a manner, that it corresponds to the desired output voltage. Consequently, the output voltage of the power supply branch may be adjusted steplessly. An electric motor connected to a controllable energy store operated in such a manner constitutes an inductive load. The current setting in due to this inductive load corresponds to a current, as would set in by directly applying a voltage having the value of the arithmetic mean. Unwanted torque fluctuations are prevented in this manner.

According to a preferred, specific embodiment of the present invention, a desired output voltage U_setpoint of a power supply branch, which lies between two output voltage values U1 and U2 attainable by permanently switching energy storage cells into the power supply branch or bypassing energy storage cells, is set by controlling coupling units of energy storage modules, which produce the output voltage value U1, in such a manner, that the specific energy storage cells are permanently switched into the power supply branch, and a coupling unit, which is assigned to energy storage cells that would increase the output voltage value from U1 to U2 when permanently switched into the power supply branch, is controlled in a pulse-shaped manner at a duty factor T of $$T = \frac{\text{U\_setpoint} - U1}{U2 - U1}.$$

In this context, the duty factor indicates the ratio of pulse duration (on-time) to pulse period, the period being calculated as the sum of the pulse duration and the pause time (off-time).

This type of control has the advantage that intermediate values of the desired output voltage of a power supply branch, which may actually only be adjusted in steps, may be set via pulse-shaped control of a single coupling unit. However, it should be pointed out that the desired output voltage may also be set by controlling a plurality of coupling units in a pulse-shaped manner. The only thing that is crucial is that the arithmetic mean of the voltage of all of the energy storage cells permanently or temporarily switched into the specific power supply branch correspond to the desired output voltage.

Further features and advantages of specific embodiments of the present invention result from the following description with reference to the figures.

DETAILED DESCRIPTION OF EXAMPLE EMBODIMENTS

Figure 1:
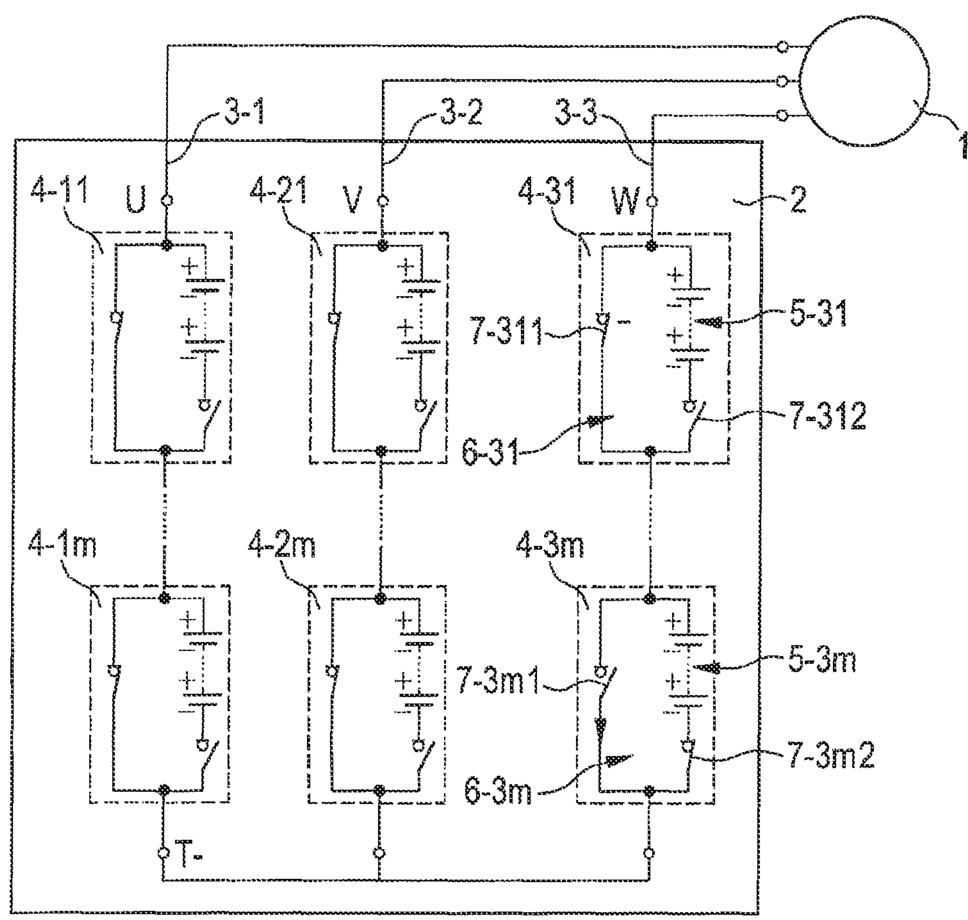
FIG. 1 shows a schematic representation of an electric motor having a controllable power supply.

A controllable energy store 2 is connected to a three-phase electric motor (FIG. 1). Controllable energy store 2 includes three power supply branches 3-1, 3-2 and 3-3, which, in the illustrated specific embodiment, are connected, on one side, to a reference potential T-(reference bus) carrying a low potential, and are connected, on the other side, to individual phases U, V, W, respectively, of electric motor 1. Each of the power supply branches 3-1, 3-2 and 3-3 has m serially connected energy storage modules 4-11 to 4-1*m*, 4-21 to 4-2*m* and 4-31 to 4-3*m*, where m≥2. Energy storage modules 4 each include, in turn, several serially connected, electrical energy storage cells, which, for reasons of clarity, are provided with reference numerals 5-31 to 5-3*m* in only the power supply branch 3-3 connected to phase W of electric motor 1. In addition, energy storage modules 4 each include a coupling unit, which is assigned to the energy storage cells 5 of respective energy storage module 4. For reasons of clarity, the coupling units are also only provided with reference numerals 6-31 to 6-3*m* in power supply branch 3-3. In the embodiment variant illustrated, coupling units 6 are each formed by two controllable switch elements 7-311 and 7-312 to 7-3*m*1 and 7-3*m*2. In this context, the switch elements may be implemented as power semiconductor switches, e.g., in the form of IGBTs (insulated gate bipolar transistors), or as MOSFETs (metal oxide semiconductor field-effect transistors).

Coupling units 6 allow the specific power supply branch 3 to be disconnected by opening the two switch elements 7 of a coupling unit 6. Alternatively, by closing, in each instance, one of the switch elements 7 of a coupling unit 6, energy storage cells 5 may either be bypassed, e.g., by closing switch 7-311, or switched into the specific power supply branch 3, e.g., by closing switch 7-312.

Consequently, coupling units 6 allow phases U, V, W of electric motor 1 to be connected to either a high reference potential or a low reference potential, and in this respect, they may also fulfill the function of a conventional inverter. Thus, the power and operating mode of electric motor 1 may be controlled by controllable energy store 2 when coupling units 6 are appropriately driven. Therefore, in this respect, controllable energy store 2 fulfills a dual function, since it is used, on one hand, for supplying electrical energy, but, on the other hand, for controlling electric motor 1, as well.

In the exemplary embodiment illustrated, electric motor 1 is implemented as a three-phase machine, but may also have fewer or more than three phases. Of course, the number of power supply branches 3 in controllable energy store 2 is also a function of the number of phases of the electric motor.

In the exemplary embodiment illustrated, each energy storage module 4 has several serially connected energy storage cells 5. However, as an alternative, energy storage modules 4 may each have only one single energy storage cell or also parallelly connected energy storage cells, as well.

In the exemplary embodiment illustrated, coupling units 6 are each formed by two controllable switch elements 7. However, coupling units 6 may also be implemented by more or fewer controllable switch elements, as long as the necessary functions (bypassing the energy storage cells and switching the energy storage cells into the power supply branch) are realizable. Alternative exemplary embodiments of a coupling unit are derived from the German Patent Application Nos. applications DE 10 2010 027 857 and DE 10 2010 027 801. In addition, however, it is also possible for the coupling units to have switch elements in a full bridge circuit configuration, which provides the additional option of inverting voltage at the output of the energy storage module.

Figure 2:
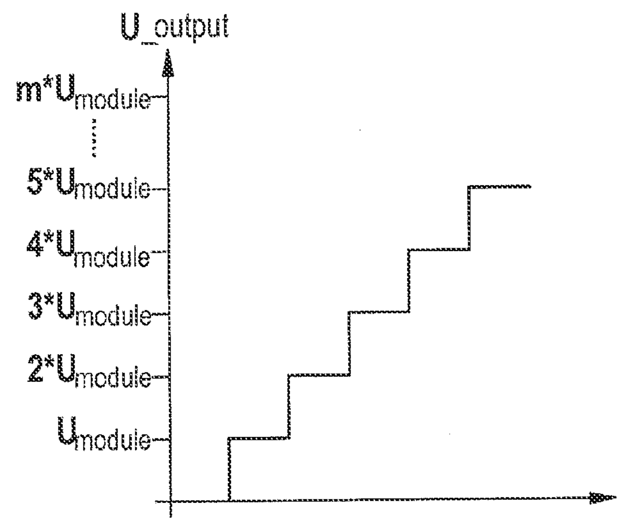
FIG. 2 shows a graph of the adjustable output voltages of a power supply branch without pulse-shaped control.

The total output voltages of power supply branches 3-1 through 3-3 are determined by the specific switching state of controllable switch elements 7 of coupling units 6 and may be adjusted in steps. In this context, the gradation is produced as a function of the voltage of individual energy storage modules 4. If one starts out from a preferred specific embodiment of energy storage modules 4 of the same kind, then a maximum possible, total output voltage U output is calculated from the voltage of an individual energy storage module 4 times the number m of serially connected energy storage modules 4 per power supply branch. Such an output voltage of a power supply branch that is adjustable in steps is schematically represented in FIG. 2.

In the following, the setting of a desired output voltage for a single power supply branch 3, namely, power supply branch 3-3, is described by way of example. In this context, it is assumed that energy storage cells 5-31 of first energy storage module 4-31 of power supply branch 3-3 provide an output voltage U1 in response to being permanently switched into power supply branch 3-3, and that energy storage cells 5-3*m* of the mth energy storage module 4-3*m* of power supply branch 3-3 provide an output voltage Um in response to being permanently switched into power supply branch 3-3, where Um=U2−U1, which means that permanently switching in the energy storage cells of the two energy storage modules 4-31 and 4-3*m* results in an output voltage U2. In addition, it is assumed that a desired output voltage U_setpoint should be set, which lies between voltage values U1 and U2.

According to the present invention, this desired output voltage U_setpoint is now set, in that coupling unit 6-31, which is assigned to energy storage cells 5-31, is controlled in such a manner by a control unit not shown, that energy storage cells 5-31 are permanently switched into power supply branch 3-3. Specifically, this is achieved by permanently closing switch element 7-312 while permanently opening switch element 7-311. In this manner, a first portion of desired output voltage U_setpoint having the voltage value U1 is provided. Coupling unit 6-3*m* is driven by the control unit not shown, in a pulse-shaped manner, at a pulse control factor of $$T = \frac{\text{U\_setpoint} - U1}{U2 - U1}.$$

Specifically, this means that for the duration of a pulse, switch element 7-3*m*2 is closed and switch element 7-3*m*1 is open, and that during a pause time, switch element 7-3*m*2 is open and switch element 7-3*m*1 is closed. In this manner, a second portion of desired output voltage U_setpoint is made available. All of the remaining energy storage cells 5-32 through 5-3($m-1$) in power supply branch 3-3 are not needed for setting desired output voltage U_setpoint. Therefore, corresponding coupling units 6-32 through 6-3($m-1$) are controlled in such a manner, that the assigned energy storage cells 5-32 through 5-3($m-1$) are permanently bypassed. Therefore, arithmetic mean U of the output voltage for power supply branch 3-3 is expressed by the formula $$\overline{U} = U1 + T \cdot Um = U1 + \frac{\text{U\_setpoint} - U1}{U2 - U1} \cdot (U2 - U1) = \text{U\_setpoint}$$

An electric motor 1 connected to a controllable energy store 2 operated in such a manner constitutes an inductive load; the current setting in due to this inductive load corresponding to a current, as would set in by directly applying a voltage having the value of the arithmetic mean. Consequently, the method of the present invention allows the output voltage of power supply branches 3-1 through 3-3 to be adjusted steplessly.

Figure 3:
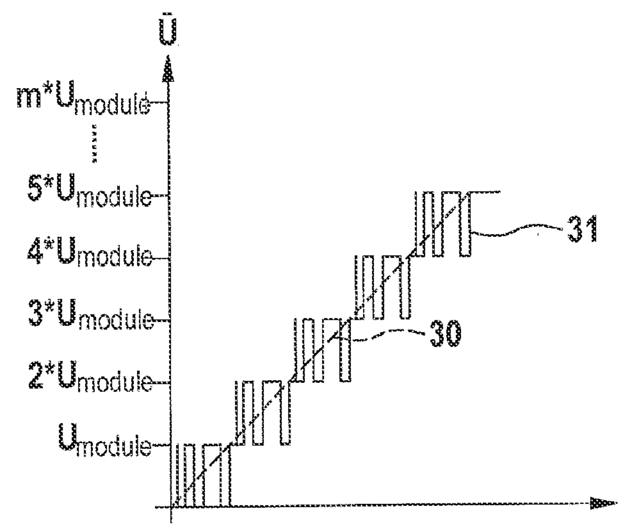
FIG. 3 shows a graph of the adjustable output voltages of a power supply branch with pulse-shaped control.

FIG. 3 schematically shows the output voltages at a power supply branch 3 that are adjustable with the aid of the method according to the present invention. In this context, the steplessly adjustable output voltage is denoted by reference numeral 30. A principal representation of the pulse-shaped control signals is denoted by reference numeral 31. In a manner analogous to the representation in FIG. 2, in the case of the representation in FIG. 3, the preferred specific embodiment of energy storage modules 4 of the same kind is used as a baseline. However, this is not required for the applicability of the present invention.

Apart from the specifically described form of controlling coupling units 6, desired output voltage U_setpoint may also be set using alternative forms of control. Thus, the first portion of desired output voltage U_setpoint having the voltage value U1 may also be provided, of course, by an energy storage module other than energy storage module 4-31. The only condition is that energy storage cells 5 of corresponding energy storage module 4 be able to supply exactly the voltage U1. In the same way, a coupling unit other than coupling unit 6-3*m* may also be controlled in a pulse-shaped manner. In this context, it should be ensured that the duty factor is correspondingly adjusted. In addition, it is possible to control not only one coupling unit 6 in a pulse-shaped manner, but rather several coupling units 6 at suitable duty factors. In each case, it is only important that an arithmetic mean of the voltage of all of the energy storage cells 5 permanently or intermittently switched into power supply branch 3 results, which corresponds to desired output voltage U_setpoint.

What is claimed is:

1. A method for setting a desired output voltage of a power supply branch of a controllable energy store, which is used for controlling and supplying electrical energy to a n-phase electric motor, where n≥1, the controllable energy store having n parallel power supply branches, which each have at least two serially connected energy storage modules which each include at least one electrical energy storage cell having an assigned, controllable coupling unit, the n parallel supply branches each being connectible to a reference bus on one side, and connectible, on the other side, to phases of the electric motor, respectively, the method comprising:

bypassing, using the coupling units, the respectively assigned energy storage cells or switching the respectively assigned energy storage cells into the respective power supply branch, as a function of control signals, at least one of the coupling units being driven by pulses in such a manner that an arithmetic mean of an output voltage of a power supply branch corresponds to a desired output voltage, the energy storage respectively assigned to the at least one coupling unit being switched into the respective power supply branch for a duration of a pulse, and being bypassed during a pause time.

2. The method as recited in claim 1, wherein a desired output voltage of a power supply branch, which lies between two output voltage values U1 and U2 attainable by permanently switching energy storage cells into the power supply branch or bypassing energy storage cells, is set by:

controlling coupling units of energy storage modules, which produce the output voltage value U1, in such a manner, that the respective energy storage cells are permanently switched into the power supply branch; and controlling a coupling unit, which is assigned to energy storage cells that would increase the output voltage value from U1 to U2 in response to being permanently switched into the power supply branch, in a pulse-shaped manner at a duty factor T of $$T = \frac{\text{U\_setpoint} - U1}{U2 - U1}.$$

* * * * *